(12) United States Patent
Okamoto et al.

(10) Patent No.: US 6,480,008 B2
(45) Date of Patent: Nov. 12, 2002

(54) CAPACITIVE DISTANCE SENSOR FOR SURFACE CONFIGURATION DETERMINING APPARATUS

(75) Inventors: Kiyokazu Okamoto, Tsukuba (JP); Sotomitsu Hara, Tsukuba (JP); Nobuhisa Nishioka, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/726,383

(22) Filed: Dec. 1, 2000

(65) Prior Publication Data

US 2002/0021133 A1 Feb. 21, 2002

(30) Foreign Application Priority Data

Dec. 3, 1999 (JP) ............................................ 11-345395

(51) Int. Cl.[7] .............................................. G01R 27/26
(52) U.S. Cl. ...................... 324/662; 324/661; 324/686
(58) Field of Search ................................. 324/662, 661, 324/658, 663, 690, 686, 71.1

(56) References Cited

U.S. PATENT DOCUMENTS

| 4,568,873 A | * | 2/1986 | Oyanagi et al. | 324/662 |
| 4,816,744 A | * | 3/1989 | Papurt et al. | 324/662 |
| 5,270,664 A | * | 12/1993 | McMurtry et al. | 324/690 |
| 5,272,443 A | * | 12/1993 | Winchip et al. | 324/662 |
| 5,517,124 A | * | 5/1996 | Rhoades et al. | 324/662 |

* cited by examiner

Primary Examiner—N. Le
Assistant Examiner—Anjan K. Deb
(74) Attorney, Agent, or Firm—Armstrong, Westerman & Hattori, LLP

(57) ABSTRACT

A capacitive distance sensor adapted to measure a distance between an object and the sensor device, which is suitable for determining surface configuration of an object includes a objective electrode, moving device for the objective electrode and a detecting means of moving distance of the objective electrode. The moving device is controlled depending on the signal from the objective electrode to position it in a predetermined range of clearance. The distance between the object and the sensor device is calculated based on the signals from the detecting means and the objective electrode.

15 Claims, 6 Drawing Sheets

CAPACITIVE DISTANCE SENSOR FOR SURFACE CONFIGURATION DETERMINING APPARATUS

FIELD OF THE INVENTION

This invention relates to a capacitive distance sensor adapted to measure clearance between an objective electrode and an object as a function of electrical capacitance changes between them, and more particularly to capacitive measuring device applicable to a configuration measuring apparatus of the a surface of an object.

BACKGROUND OF THE INVENTION

Capacitive distance sensors which are based on the principle that the capacitance between two capacitor plates is inversely proportional to the distance between them have been well known. These capacitive distance sensors have many advantages, like high sensitivity, high credibility, good response and a long durable life of the sensors in comparison of other type clearance sensors, like optical sensors, electromagnetic sensors, fluidic sensors and the like. For measuring accurately a small clearance distance with this distance sensor, it is essential that the sensor has a small face of the electrode plate and be positioned in a limited narrow range of a clearance, because a capacitive distance sensor measures a average distance in the face area of the electrode plate of the sensor and has an effective measurable range of clearance distance proportional to the face area of the electrode plate. For example, in the case of measuring to an accuracy of the order of 1 nanometer, the sensor must be positioned in the effective range of 100 of a clearance.

A capacitive distance sensor having a small face area can measure a distance of a restricted range of a clearance. A positioning this sensor adjacent to an object in the restricted range of a clearance is required a highly skilled technician or a complicated positioning device. When a configuration of a surface of an object is determined from the results of measuring distance, it is more difficult and wastes much time to position the sensor at a large number of the measuring point on an object.

SUMMARY OF THE INVENTION

The present invention has been devised to overcome above described problem associated with the use of the capacitive distance sensor.

Accordingly, it is an object of the present invention to provide an electrical capacitive distance sensor comprising a fixed frame, an objective electrode adjacent to an object, a supporting device for moving the objective electrode to position said probe in the effective measuring range of a clearance, a moving distance detecting means for detecting a moving distance of the objective electrode, a clearance detecting means for detecting a clearance distance between the objective electrode and the object, a calculating means for calculating a distance between the object and the frame based on the signals from the moving distance detecting means and the clearance detecting means.

It is another object of the present invention to provide an electrical capacitive distance sensor comprising a frame, an objective electrode adjacent to the object, a rod for carrying the objective electrode, a linear motor for moving axially the rod, a clearance detecting means for detecting a clearance distance between the objective electrode and the object based on a capacitance between them, a control means for controlling the linear motor depending on a signal from said clearance detecting means to position said objective electrode in the predetermined range of a clearance between them, a moving distance detecting means for detecting a distance of the objective electrode, a calculating means for calculating a distance between the object and the frame based on the signals from the moving distance detecting means and the clearance detecting means.

It is a further object of the present invention to provide a determining configuration apparatus adapted to determine a configuration of a surface of an object which comprises a capacitive distance sensor including a objective electrode, a supporting device for moving the objective electrode to position said probe in the predetermined range of a clearance between said probe and the object, a moving distance detecting means for detecting a moving distance of the objective electrode, a clearance detecting means for detecting a clearance distance between the objective electrode and the object based on a capacitance between them, a calculating means for calculating a distance between the object and the frame based on the signals from the moving distance detecting means and the clearance detecting means; a positioning device for moving relatively the objective electrode along the surface of the object; and a configuration determining means for determining the configuration of the surface of the object based on the signals from the calculating means.

A capacitive distance sensor of the present invention comprises an a moving distance detecting means for detecting a moving distance of the objective electrode, and a clearance detecting means for detecting a clearance distance between the objective electrode, therefore, this distance sensor can measure a wide range distance even using a objective electrode of small face area. Furthermore, the objective electrode is feedback controlled based on a signal of itself, it is easy to position it in a effective measurable range of clearance.

DESCRIPTION OF PREFERRED EMBODIMENTS

Figure 1:
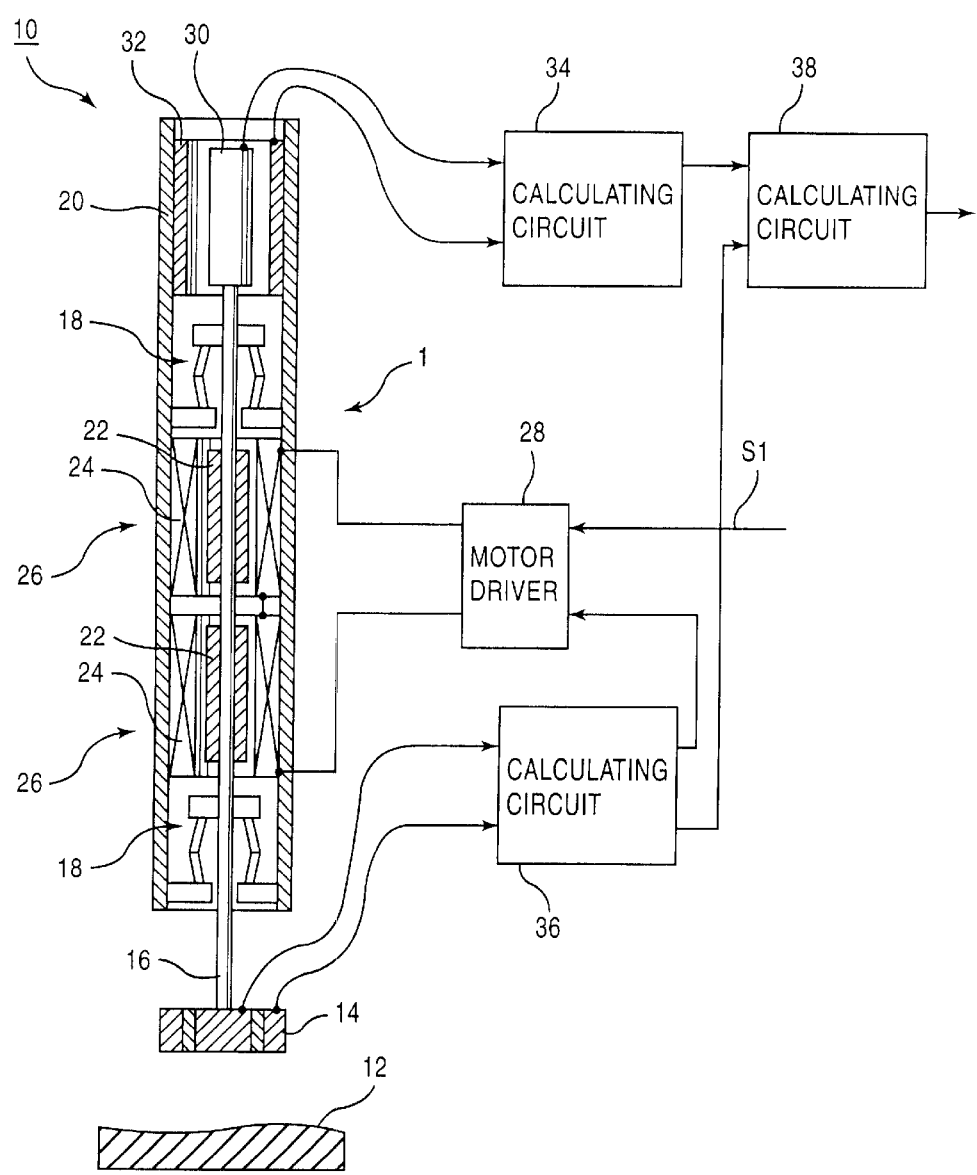
FIG. 1 is a schematic cross sectional view of capacitive distance sensor embodying features of the present invention.

FIG. 1 shows a capacitive distance sensor 10 for measuring a distance between the predetermined standard point on the sensor device and a surface of an object 12, preferred embodiment of the present invention. The capacitive distance sensor 10 comprises a first measuring device including an objective electrode 14, a calculating circuit 36 and a second measuring device including a shifting electrode 30, fixed electrode 32 and a calculating circuit 34.

The capacitive distance sensor 10 includes a cylindrical frame 20 and an objective electrode 14 fixed to the end of a rod 16 and facing closely to a surface of an object 12. The rod 16 coaxially disposed in the cylindrical frame 20 is supported to keep a neutral position by two supporting devices 18, 18 which are provided separately in a cylindrical frame 20. The supporting devices 18, 18 have elasticity forcing against axially deviation of rod from the neutral position.

A linear motor 26 comprising a magnet 22 and a coil 24 is provided between the rod 16 and the cylindrical frame 20. In the embodiment showing in FIG. 1, the two magnets 22, 22 are fixed to the rod 16 and the two coils 24, 24 are fixed to an inner face of the cylindrical frame 20. A motor driver 28 supplies electric power to the linear motor 26 for moving axially the rod 16. A portion of the cylindrical frame 20 to which the coil 24 is fixed is preferably made of materials with a low reluctance for efficiency of the linear motor. A rack-and-pinion mechanism with a electric motor can be applied for the driving means of the rod 16 in place of the linear motor.

The capacitive distance sensor 10 includes a second measuring device, a moving distance detecting device comprising of a shifting electrode 30 fixed to another end portion of the rod 16 and a fixed electrode 32 fixed to of a inner wall of the cylindrical frame 20 in the opposite position with the shifting electrode 30. A capacitance between the shifting electrode 30 and fixed electrode 32 depends on a relative moving distance of the rod 16, i.e. the objective electrode, to the cylindrical frame 20. The both electrodes 30, 32 sense the capacitance and output signals corresponding to the capacitance to a calculating circuit 34 for calculating a moving distance of the objective electrode 14 based on the input signals. The calculating circuit 34 supplies the shifting distance signal to a calculating circuit 38.

The objective electrode 14 senses a capacitance of a clearance between the objective electrode 14 and the object 12, and supplies a signal corresponding to the capacitance to a calculating circuit 36 for calculating a distance of the clearance between them. The calculating circuit 36 supplies the clearance distance signal to the calculating circuit 38 and to the motor driver 28. An appointed value Si of a clearance, for example the intermediate value of the effective measurable clearance, is entered into the motor driver 28. The motor driver 28 controls the linear motor 26 based on the clearance distance signal and the appointed value Si to move the rod 16 for positioning the objective electrode 14 in a predetermined range or a predetermined value of a clearance distance from the surface of the object 12. Therefore, the objective electrode 14 is positioned in a proper range of a clearance distance to measure precisely a clearance distance. The calculating circuit 38 determines a distance between a surface of the object 12 and a standard level on the cylindrical frame 20 based on the signals of the calculating circuits 34 and 36.

Figure 2:
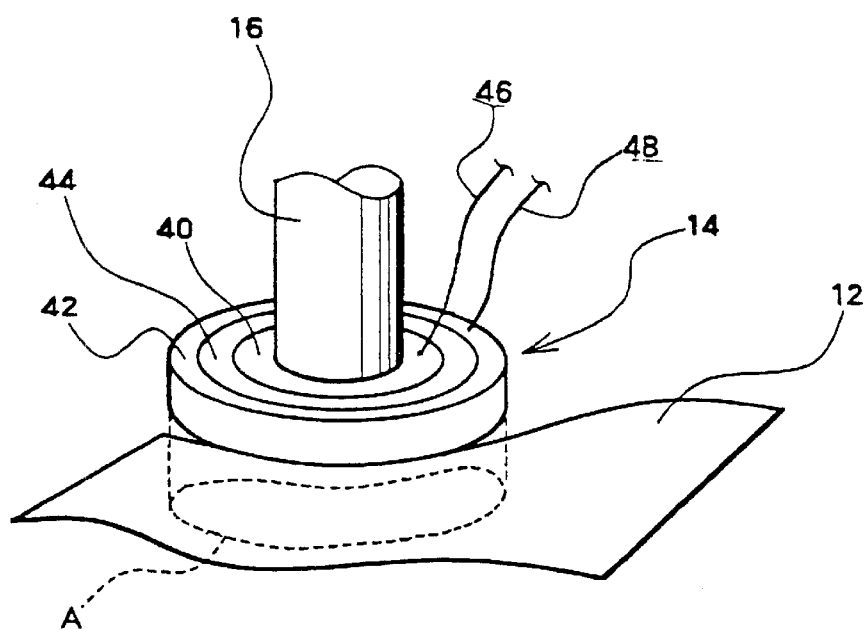
FIG. 2 is an enlarged, perspective view of the objective electrode of the capacitive distance sensor.

FIG. 2 shows a detail of the one embodiment of the objective electrode 14, which comprises a disk electrode 40, an annular electrode 42 and an annular insulator 44 inserted between them. A disk electrode 40 is attached with insulating material to the rod 16 projecting perpendicularly from the plane of the electrode. Two leads 46 and 48 are connected respectively to the disk electrode 40 and the annular electrode 44. The leads 46,48 are connected to the calculating circuit 36. When the objective electrode 14 is positioned facing the object 12, the both electrodes 40, 42 and the object 12 form a capacitor. A capacitance of this capacitor is inversely proportional to the average distance of the clearance in a projected area A of the objective electrode 14.

Figure 3:
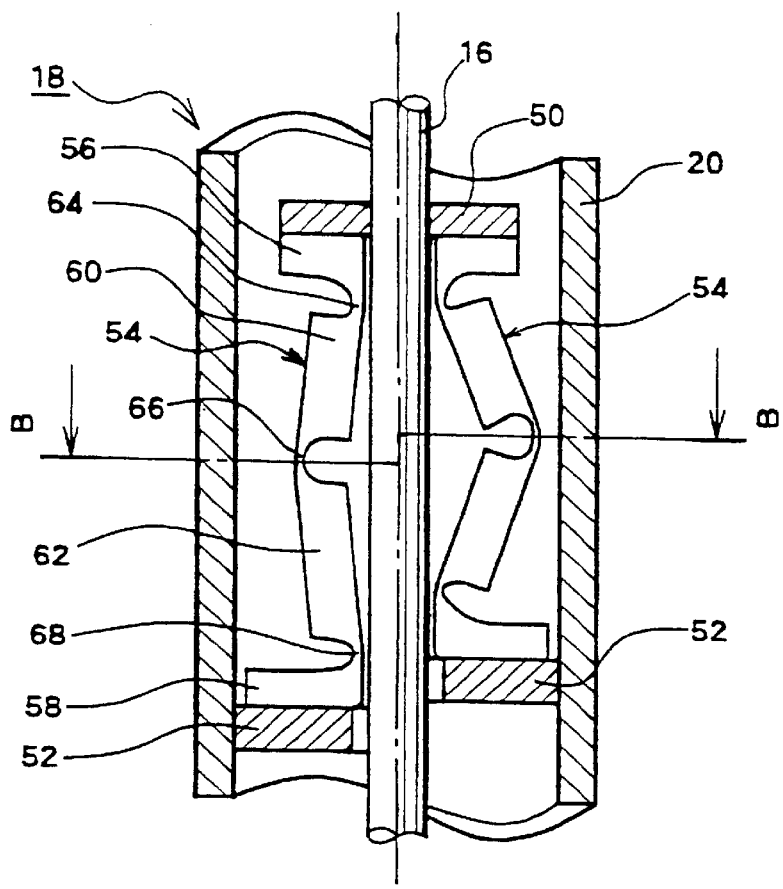
FIG. 3 is a cross sectional view of one embodiment of the rod support device of the capacitive distance sensor.
Figure 4:
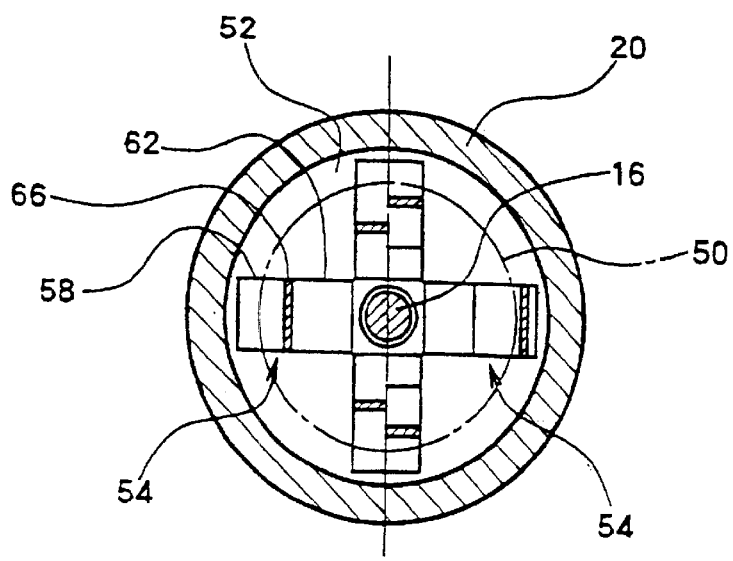
FIG. 4 is a horizontal sectional view of the rod support device taken substantially along the line B—B of FIG. 3.

FIGS. 3 and 4 show a detail of a first embodiment of the rod support device 18. A outer flange disk 50 is fixed to the rod 16 with some space between an outer peripheral of the flange 50 and an inner wall of the cylindrical frame 20. An annular inner flange 52 is fixed to an inner wall of the cylindrical frame 20 and the rod 16 passes through a center hole of the inner flange 52. Four leg members 54 disposed apart with a same angle are attached to the both of the flange 50, 52. Each of leg members 54 formed in one body includes the both attached portions 56, 58 to the both of flange 50,52, two plate portions 60, 62 and three grooves of elastic hinges 64, 66, 68.

The leg member 54 is disposed in the vertical plane to the plane which contains the axis of the rod 16 and the longitudinal center line of the leg member 54, so that the normal line to the longitudinal center line of the leg member 54 at any point crosses the axis of the rod 16. The attached portion 56, 58 and the hinge groove 64, 66, 68 have a about same size of the plate 60,62 in width and the plate 60, 62 bends elastically at the hinge grooves 64, 66, 68. FIGS. 3 and 4 show the supporting member 54 in an extending state in the left side and it in a bending state in the right side of the drawings.

Each of hinge grooves 64, 66, 68 is at right angle to the longitudinal center line of the leg member 54, therefore the longitudinal center line of the leg member 54 is keeping in the same plain while bending motion of the leg member 54 and a radial movement of the rod 16 is restricted. A support device 18 has at least three leg members to restrict a radial movement of the rod 16 and the two support devices are balanced to force the rod 16 in the neutral position. In order to be a equal bending property the leg member is preferably made by a precision casting.

Figure 9:
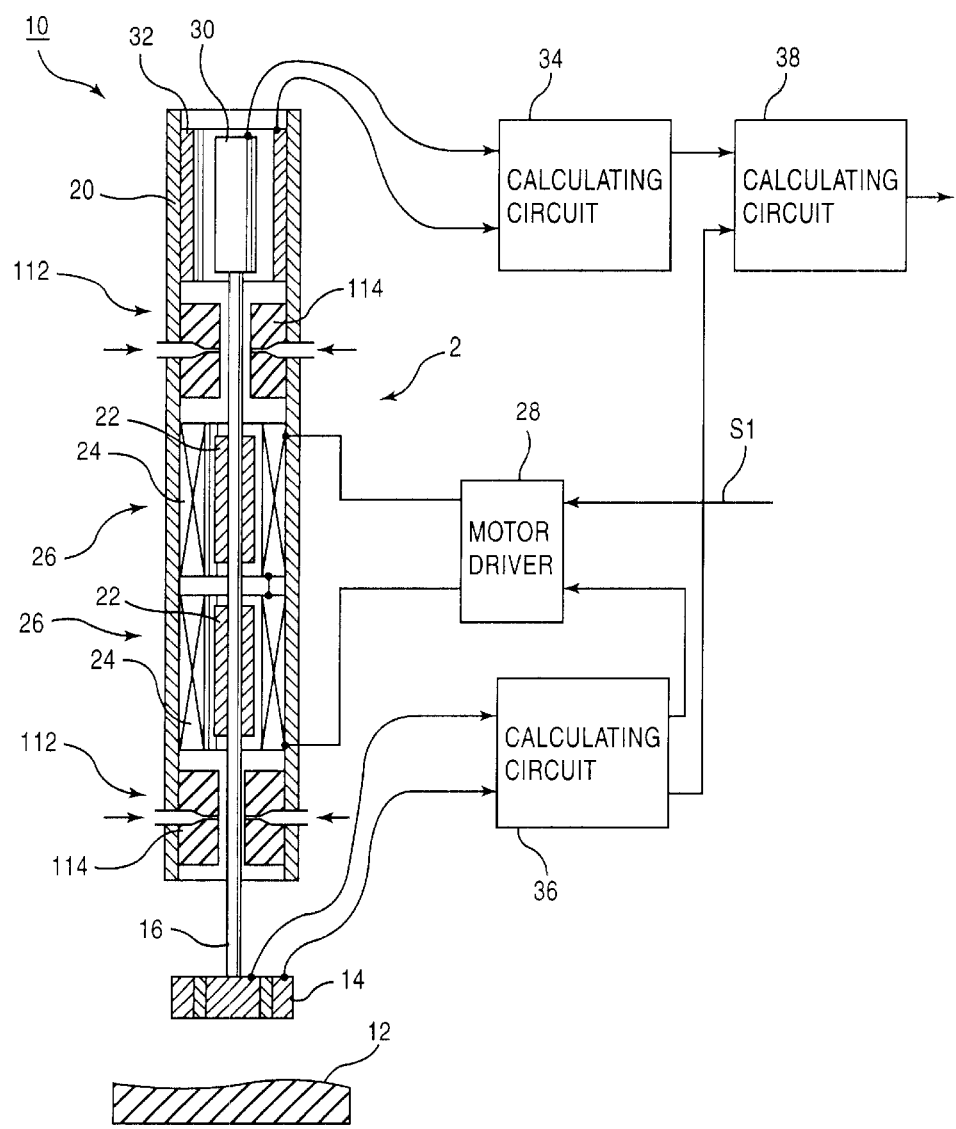
FIG. 9 is a schematic cross sectional view of another embodiment of the capacitive distance sensor of the present invention.

FIG. 9 shows another preferred embodiment of the invention which has one significant difference from the first embodiment previously described in reference of FIG. 1. A difference between the capacitive distance sensor 100 of FIG. 9 and the first embodiment of FIG. 1 is that the support device is a pair of static gas bearing 112. The gas bearing 112 comprises a air pad 114 surrounding the rod 16 and an air pump or a reservoir, not shown, supplying the air into the air pad 114. Blow off ports of the air pad are provided at its peripheral in the rectangular plane to the rod 16. Using the static gas bearing, a range of a moving distance of the rod is enlarged.

Figure 5:
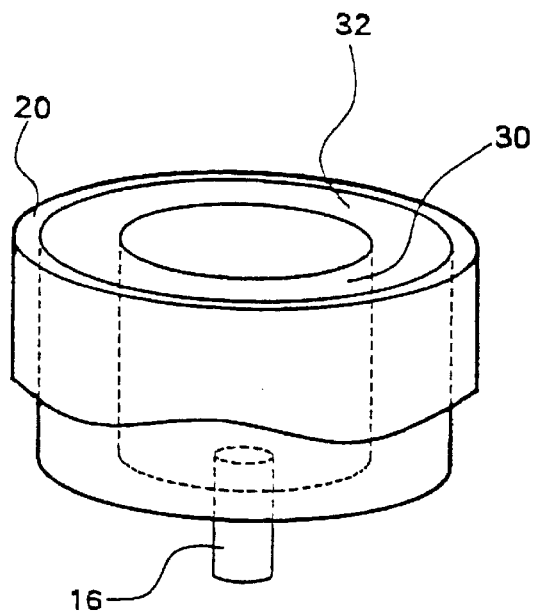
FIG. 5 is a schematic perspective view of the first embodiment of the moving distance detecting device.

FIG. 5 shows a detail of the first embodiment of a moving distance detecting device comprising of the moving electrode 30 and the fixed electrode 32. The columnar moving electrode 30 is fixed to the rod 16 and the annular fixed electrode 32 is fixed to an inner wall of the cylindrical frame 20. A opposed area of the both electrodes and a capacitance between them varies according to a moving distance of the rod 16. The calculating circuit 34 calculates a moving distance of the rod 16, i.e. a moving distance of the objective electrode 14 based on a variance of a capacitance. It is also possible that a columnar electrode is fixed to the top end of the cylindrical frame 20 as a fixed electrode and a cylindrical electrode is fixed to the end of the rod 16 as moving electrode.

Figure 6:
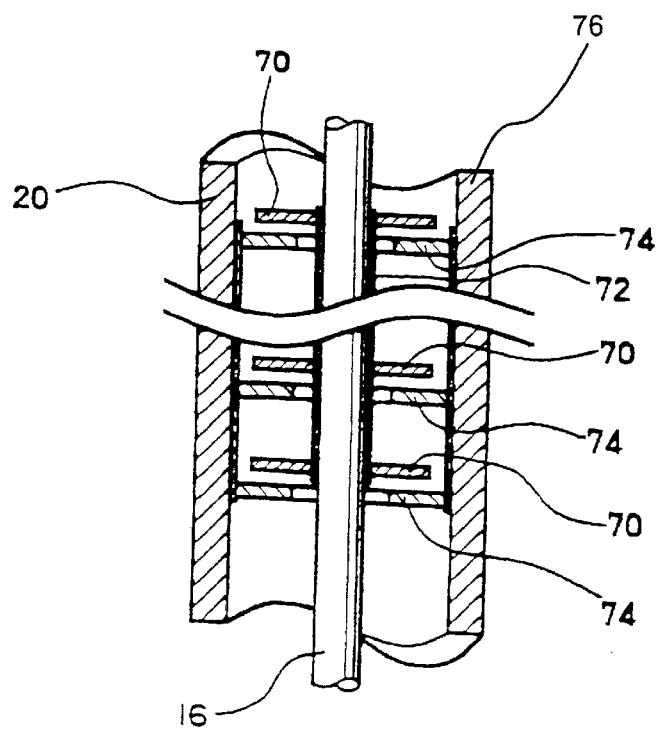
FIG. 6 is a cross sectional view of the second embodiment of the moving distance detecting device.
Figure 7:
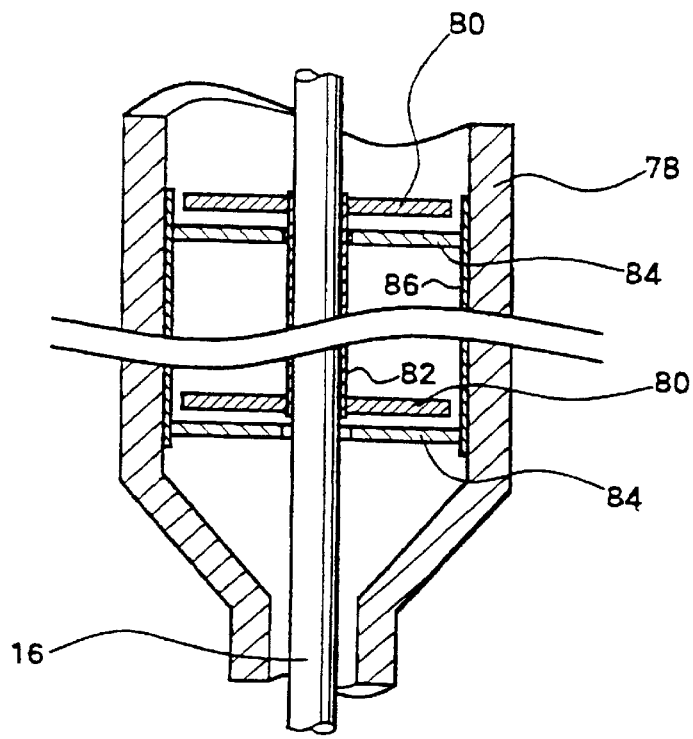
FIG. 7 is a cross sectional view of the third embodiment of the moving distance detecting device.

FIG. 6 and FIG. 7 show the detail of the second embodiment of the moving distance detecting device. In this embodiment, the moving electrode 70 and the fixed electrodes 74 are formed from three disk type electrodes 70,74 respectively. The moving electrodes 70 are attached to the rod 16 with a space in the axial direction and the electrodes 70 are connected electrically to a conductor 72. The fixed electrodes 74 separately attached to the inner wall of the cylindrical frame 20 are opposite with each of the moving electrodes 70 respectively and the electrodes 74 are connected electrically to a conductor 76. The fixed electrodes 74 have center holes, the rod 16 moves axially through the holes. The capacitance between the moving electrodes 70 and the fixed electrodes 74 is proportional to a moving distance of the rod 16, therefore the calculating circuit 34 calculates a moving distance of the rod 16, i.e. a moving distance of the objective electrode 14 based on the variance of a capacitance. In the case of this embodiment using the plural disk electrode, the opposite area of the both electrodes 70, 74 can enlarge to measure in wide range of the moving distance of the objective electrode 14. The moving electrode 70 and the fixed electrode 74 are disposed enough apart from the objective electrode 14 to avoid a capacitive coupling between them.

In FIG. 7, the two moving electrodes 80 and the two fixed electrodes 84 enlarged in diameter are disposed in the axially expanded portion 78 of the cylindrical frame 20, which is enough apart from the objective electrode 14. The moving electrodes 80 and the fixed electrodes 84 are connected electrically to the conductors 82 and 86 respectively. In this embodiment, the opposite area of the both electrodes 80,84 is enlarged while the both electrodes 80, 84 are disposed enough apart from the objective electrode 14.

Figure 8:
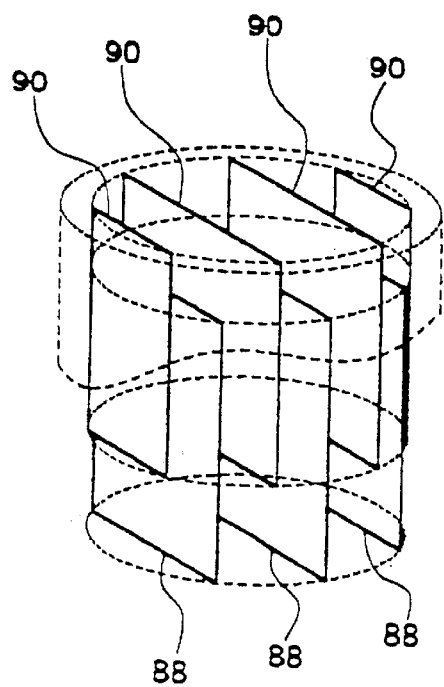
FIG. 8 is a schematic perspective view of the forth embodiment of the moving distance detecting device.

FIG. 8 shows a schematic view of the third embodiment of the moving distance detecting device. The plural plate electrodes 90 in parallel are attached to the inner wall of the cylindrical frame 20 and the plural plate electrodes 88 in parallel are attached to the rod 16, each plate of the plate electrodes 88 is placed in proximity to each plate of the plate electrodes 90. The plural plates of the moving electrode 88, and the fixed electrode 90 are connected electrically to two conductors, not shown, respectively. In addition, a optical distance meter or a linear scale can be used for the moving distance detecting device in place of capacitive detecting device above described.

The capacitive distance sensor 10 of the invention is suitable for application to a configuration determining apparatus adapted to determine a surface configuration of an object based on the clearance distances at the large number of measuring point on the surface of the object. The capacitive distance sensor 10 is mounted to a robotic arm, not shown in FIG. 8, which is operated in a program mode or using manual controls to position the capacitive distance sensor 10 at measuring point along any of the three orthogonal axis on the surface of the object 12. A predetermined value 51 of a clearance, for example the intermediate value of the effective measurable clearance, is entered into the motor driver 28. The robotic arm moves the capacitive distance sensor 10 to position it at the measuring point on the object 12 and at the approximate appointed value of a clearance according to the instruction, then, the robotic arm moves the sensor device 10 horizontally along the surface of the object 12. The objective electrode 14 detects continuously or occasionally at the instructed measuring points a capacitance and supplies a capacitance value to the calculating circuit 36, this circuit 36 outputs a signal correspond to a clearance distance into the motor driver 28 and the distance calculating circuit 38. The motor driver 28 controls the linear motor 26 based on the signal of the circuit 36 to move the rod 16 for adjusting the position of the objective electrode 14 to the clearance of the predetermined value S1. The moving distance of the objective electrode is detected by the both electrodes 30, 32 and the calculating circuit 34. This circuit 34 outputs the signal correspond to the moving distance into the distance calculating circuit 38. The configuration determining device, not shown in FIG. 8, determines based on the continuous or occasional signals from the distance calculating circuit 38 to display the sectional view and the like.

What is claimed is:

1. A capacitive distance sensor adapted to measure a distance to an object surface, the distance sensor comprising:
    a cylindrical frame;
    an objective electrode;
    a rod disposed coaxially in the cylindrical frame to carry the objective electrode that is attached to the end of the rod;
    a rod support supporting the rod to be movable axially, including a restricting means for restricting radial movement of the rod;
    a linear motor axially moving the rod and disposed between the cylindrical frame and the rod;
    a clearance detector for detecting the clearance distance between the objective electrode and the object surface, based on a capacitance therebetween;
    a controller controlling the linear motor depending on a signal from said clearance detector to position said objective electrode within a predetermined range of the clearance distance;
    a moving distance detector for detecting a moving distance of the objective electrode;
    a distance calculator for calculating the distance based on the signals from the clearance detector and the moving distance detector for estimating an amount of ups and downs on the object surface.

2. The capacitive distance sensor according to claim 1, wherein said moving distance detector comprises a fixed electrode attached to the cylindrical frame, a moving electrode attached to the rod, and a detector of a variation of a capacitance between the fixed electrode and the moving electrode.

3. The capacitive distance sensor according to claim 2, wherein said rod support comprises means for biasing elastically the rod in the neutral position.

4. The capacitive distance sensor according to claim 2, wherein the fixed electrode comprises a disk including a center hole and the moving electrode comprises a disk disposed opposite to the fixed electrode.

5. The capacitive distance sensor according to claim 2, wherein the fixed electrode comprises a wide annular ring attached to an inner surface of the cylindrical frame, and the moving electrode comprises a wide annular ring disposed opposite to the fixed electrode.

6. The capacitive distance sensor according to claim 2, wherein the fixed electrode comprises plural plates arranged in parallel and the moving electrode comprises other plural plates respectively disposed in proximity to each of the plural plates of the fixed electrode.

7. The capacitive distance sensor according to claim 1, wherein the restricting means of the rod support includes a pair of spring means comprising at least three leg members disposed separately, and each leg comprises fixed portions at both ends thereof and an elongated plate including hinge grooves at right angles to a longitudinal center line thereof.

8. The capacitive distance sensor according to claim 1, wherein the restricting means of the rod support comprises at least two static gas bearings comprising air pads placed in both end portions of the rod and an air supplying means.

9. The configuration-determining apparatus to determine a surface configuration of an object, the apparatus comprising in combination:

the capacitive distance sensor according to claim 1;

a positioning device for moving the objective electrode generally parallel to the object surface;

a configuration determining means for determining a surface configuration of the object based on a distance signal from the distance calculator.

10. A capacitive distance sensor according to claim 9, wherein said moving distance detector comprises a fixed electrode attached to the cylindrical frame, a moving electrode attached to the rod, and a detector of a variation of a capacitance between the fixed electrode and the moving electrode.

11. The capacitive distance sensor according to claim 9, wherein the fixed electrode comprises a disk including a center hole and the moving electrode comprises a disk disposed opposite to the fixed electrode.

12. The capacitive distance sensor according to claim 9, wherein the fixed electrode comprises a wide annular ring attached to an inner surface of the cylindrical frame, and the moving electrode comprises a wide annular ring disposed opposite to the fixed electrode.

13. The capacitive distance sensor according to claim 9, wherein the restricting means of the rod support includes a pair of spring means comprising at least three leg members disposed separately, and each leg comprises fixed portions at both ends thereof and an elongated plate including hinge grooves at right angles to a longitudinal center line thereof.

14. The capacitive distance sensor according to claim 9, wherein the restricting means of the rod support comprises at least two static gas bearings comprising air pads placed in both end portions of the rod and an air supplying means.

15. A capacitive distance sensor according to claim 9, wherein said rod support comprises means for biasing elastically the rod in the neutral position.

* * * * *